UNITED STATES PATENT OFFICE.

GEORGE B. BRADSHAW, OF BROOKLYN, NEW YORK.

PROCESS OF TREATING PALO-AMARILLO AND SIMILAR GUMS.

1,024,178.  Specification of Letters Patent.  Patented Apr. 23, 1912.

No Drawing.  Application filed April 29, 1910. Serial No. 558,450.

*To all whom it may concern:*

Be it known that I, GEORGE B. BRADSHAW, a citizen of the United States, residing at Brooklyn, in the county of Kings and State of New York, have invented certain new and useful Improvements in Processes of Treating Palo-Amarillo and Similar Gums, of which the following is a full, clear, and exact description, such as will enable others skilled in the art to which it appertains to carry out and use the same.

This invention relates to a process for the treatment and utilization of the latex or crude gum from certain rubber trees, plants or the like, and, with regard to the more specific features thereof, deals with a process for treating the gum of palo amarillo (elastica euphorbia—altamirano and rose) or other trees, plants or shrubs capable of yielding a gum of a similar nature, so that the ingredients of the same may be made of commercial value.

One of the objects of this invention is to provide a practical and economical method of extracting resin from rubber gum of the above nature, that will be simple and inexpensive to perform.

Another object of the invention is to provide a process of the above nature that will be more efficient than those heretofore employed in extracting the resin from the gum, and in which the resulting gum will be of a finer quality and possess greater elastic properties.

A further object of this invention is to provide a process of the above nature that may be carried out more expeditiously and without certain disagreeable features heretofore coincident with processes of this nature.

Other objects will be in part obvious and in part hereinafter pointed out.

The invention accordingly consists in the several steps and the relation and order of one or more of such steps with relation to each of the others thereof, which will be exemplified in the hereinafter disclosed process, and the scope of the application of which will be indicated in the following claims.

It is to be noted that the latex and crude gum obtained from the palo amarillo tree, or trees of a similar nature, have hitherto been commercially unprofitable, principally because the ingredients thereof could not be economically separated and obtained in a condition in which they are directly available in the rubber industry and for industrial purposes where such plastics are essential. The process hereinafter disclosed accomplishes the desired separation of the rubber and resin and at the same time so improves the quality of the same that they are directly commercially available.

In practising this process either the latex or the coagulated gum therefrom may be used; if the former, it is first coagulated by any well known methods forming a crude coagulated mixture of rubber and resin. This crude coagulated mixture of rubber and resin is partially dried, but not entirely so, about ten per cent. of water being left in the gum for reasons hereinafter set forth. The partial drying is for the purpose of preventing the dilution of the solvents and precipitates used and interference with the action of substances added to improve the properties of the rubber product, while if all the water were dried out the gum would become tightly glued to the paddles of the stirrers of the machine. The drying is preferably done in suitable apparatus in which the latter operations may be performed. Having thus partially dried the crude gum, a solvent of both the rubber and resin contained therein is added and thoroughly incorporated with the same until a homogeneous paste is produced. This solvent may be one or more of the solvents for rubber, such as petroleum-ether, naphtha, benzin, gasolene, benzol, toluene, chloroform, carbon disulfid, carbon tetra-chlorid, etc. Having produced this paste the next step is to add a reagent capable of mixing with the solvent already used and of holding in solution all the ingredients other than the rubber, which latter is precipitated. The reagents employed for this purpose may be one or more of the following:—methyl alcohol, ethyl alcohol, acetone, ethyl acetate, methyl acetate, etc. The operation described may be facilitated by heat and agitation, using a closed vessel to prevent loss of the volatile reagents. The resin con taining solution is now drawn off from the precipitated rubber, and if necessary, the latter is again treated with a resin solvent. To the residual rubber, still containing some of the solvent, is now added a substance, or substances, which have the properties of increasing the stiffness of the rubber and overcoming its characteristic and objectionable stickiness; for example, from 1% to 5% of quicklime, or 1% to 5% of calcined magnesia. For particular technical uses such as insulation, 10% of balata or other stiff raw rubber, or suitable plastic substance may be added at this stage. Again, certain sulfids or other suitable sulfur compounds may be incorporated. The foregoing additions for improving palo amarillo rubber might be used in connection with other processes of extraction, but their employment as above outlined is especially advantageous for the reason that the mixture is made while the rubber is still soft from the action of the solvents. After incorporating the additions specified the remaining solvents are displaced by adding water and the resulting wet rubber removed from the machine, sheeted and dried on trays. If the rubber were entirely dried at this stage, or any previous time during the process before removing from the machine, it would stick to the paddles and have to be tediously removed therefrom. It is therefore advisable to always have some water or solvent present.

The solution containing the resin is treated in a suitable still for the recovery and separation of the volatile reagents employed and for obtaining the residual resin. The latter may be subjected to the action of certain bleaching reagents, such as chlorid of lime or bichromate of potash before the complete removal of the volatile reagents, the object being the production of a purified, colorless or white resin which has a commercial value for many purposes.

It will thus be seen that this invention provides a practical and efficient process for the treatment of certain rubber gums, and more particularly the gums above mentioned. It will also be noted that the process may be carried out with a single, simple and inexpensive form of apparatus, and in less time and with less trouble and expense than heretofore.

As many changes could be made in carrying out the above process without departing from the scope of the invention, it is intended that all matter contained in the above description shall be interpreted as illustrative and not in a limiting sense. It is also to be understood that the language used in the following claims is intended to cover all of the generic and specific features of the invention herein described and all statements of the scope of the invention, which, as a matter of language, might be said to fall therebetween.

Having thus described my invention, what I claim as new and desire to secure by Letters Patent is:

1. The herein described process of extracting resin from rubber gum, which consists in coagulating the latex of the gum, removing at least 80% of water therefrom, adding to the gum a solvent for the rubber and resin, precipitating the rubber therein, and separating the same from the solvent.

2. The herein described process of extracting resin from rubber gums, which consists in treating the same with a solvent for both the rubber and resin, precipitating the rubber, separating the rubber from the solvent, and adding to the rubber ingredients to change its texture, whereby the same is converted into a commercial article.

3. The herein described process of extracting resin from rubber gums, which consists in treating the gum with a solvent for both the rubber and the resin, precipitating the rubber therefrom, drawing off the solvent, adding to the precipitate calcined magnesia for changing its texture, whereby the same is converted into a commercial article.

4. The herein described process of extracting resin from rubber gums which consists in partially drying the gum until about 10% of water remains, adding to the gum a solvent for the rubber and resin, precipitating the rubber, and separating the same from the solvent in the presence of water.

5. The herein described process of extracting resin from rubber which consists in treating the same with a solvent for both the rubber and the resin, precipitating the rubber, washing the same free from all solvent in the presence of water, and adding to the rubber an ingredient to change its texture whereby the same is converted into a commercial article.

6. The herein described process of treating rubber, which consists in partially drying the same, adding a solvent thereto to entirely dissolve the gum, precipitating the rubber, washing the same free from all solvent in the presence of water, and then adding thereto certain ingredients to change its texture.

7. The herein described process of treating rubber, which consists in adding a hydrocarbon or hydrocarbon derivative thereto to dissolve the mass, precipitating the rubber from the solution by the addition of alkyl compound, separating the precipitate from the solution, and suitably treating the same by the addition of an alkaline substance to change its texture.

8. The herein described process of treating rubber gum, which consists in removing substantially all of the water therefrom within a drier, adding a solvent to dissolve the gum, precipitating the rubber in the solution by the addition of an alkyl compound, withdrawing the solution and distilling the same to recover volatile reagents and resin, adding reagents to the resin to purify and bleach the same, adding an alkaline ingredient to the precipitated rubber to increase its stiffness, removing the precipitate from the apparatus, and thoroughly drying and treating the same to reduce it to a commercial article.

In testimony whereof I affix my signature, in the presence of two witnesses.

GEORGE B. BRADSHAW.

Witnesses:
PAUL A. BLAIR,
LEONARD A. WATSON.

Copies of this patent may be obtained for five cents each, by addressing the "Commissioner of Patents, Washington, D. C."

Correction in Letters Patent No. 1,024,178.

It is hereby certified that in Letters Patent No. 1,024,178, granted April 23, 1912, upon the application of George B. Bradshaw, of Brooklyn, New York, for an improvement in "Processes of Treating Palo-Amarillo and Similar Gums," an error appears in the printed specification requiring correction as follows: Page 1, line 76, for the word "precipitates" read *precipitants;* and that the said Letters Patent should be read with this correction therein that the same may conform to the record of the case in the Patent Office.

Signed and sealed this 14th day of May, A. D., 1912.

[SEAL.]

C. C. BILLINGS,
*Acting Commissioner of Patents.* the gum, precipitating the rubber in the solution by the addition of an alkyl compound, withdrawing the solution and distilling the same to recover volatile reagents and resin, adding reagents to the resin to purify and bleach the same, adding an alkaline ingredient to the precipitated rubber to increase its stiffness, removing the precipitate from the apparatus, and thoroughly drying and treating the same to reduce it to a commercial article.

In testimony whereof I affix my signature, in the presence of two witnesses.

GEORGE B. BRADSHAW.

Witnesses:
PAUL A. BLAIR,
LEONARD A. WATSON.

Copies of this patent may be obtained for five cents each, by addressing the "Commissioner of Patents, Washington, D. C."

Correction in Letters Patent No. 1,024,178.

It is hereby certified that in Letters Patent No. 1,024,178, granted April 23, 1912, upon the application of George B. Bradshaw, of Brooklyn, New York, for an improvement in "Processes of Treating Palo-Amarillo and Similar Gums," an error appears in the printed specification requiring correction as follows: Page 1, line 76, for the word "precipitates" read *precipitants;* and that the said Letters Patent should be read with this correction therein that the same may conform to the record of the case in the Patent Office.

Signed and sealed this 14th day of May, A. D., 1912.

[SEAL.]

C. C. BILLINGS,
*Acting Commissioner of Patents.*

Correction in Letters Patent No. 1,024,178.

It is hereby certified that in Letters Patent No. 1,024,178, granted April 23, 1912, upon the application of George B. Bradshaw, of Brooklyn, New York, for an improvement in "Processes of Treating Palo-Amarillo and Similar Gums," an error appears in the printed specification requiring correction as follows. Page 1, line 76, for the word "precipitates" read *precipitants;* and that the said Letters Patent should be read with this correction therein that the same may conform to the record of the case in the Patent Office.

Signed and sealed this 14th day of May, A. D., 1912.

[SEAL.]

C. C. BILLINGS,
*Acting Commissioner of Patents.*